United States Patent
Kataoka

(10) Patent No.: US 6,794,454 B2
(45) Date of Patent: Sep. 21, 2004

(54) RUBBER COMPOSITION FOR SOLID GOLF BALL, METHOD FOR PRODUCING THE RUBBER COMPOSITION, AND SOLID GOLF BALL

(75) Inventor: Nobuyuki Kataoka, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 121 days.

(21) Appl. No.: 10/302,873

(22) Filed: Nov. 25, 2002

(65) Prior Publication Data
US 2003/0134946 A1 Jul. 17, 2003

(30) Foreign Application Priority Data

Nov. 28, 2001 (JP) .................................... 2001-362654
Nov. 7, 2002 (JP) .................................... 2002-324129

(51) Int. Cl.$^7$ .................. C08L 253/00; A63B 53/08
(52) U.S. Cl. ............... 525/245; 525/261; 525/274; 525/329.8; 524/175; 524/392; 524/464; 522/60; 522/82; 522/111; 473/351
(58) Field of Search ............... 525/245, 261, 525/274, 329.8; 524/175, 392, 464; 522/60, 82, 111; 473/351

(56) References Cited

U.S. PATENT DOCUMENTS 5,252,652 A    10/1993   Egashira et al.
6,583,229 B2 * 6/2003   Mano et al. ................ 525/261

FOREIGN PATENT DOCUMENTS

| JP | 02-092378 | 4/1990 |
| JP | 04-109970 | 4/1992 |
| JP | 2-669051 B2 | 7/1997 |
| JP | 2001-187167 A | 7/2001 |

* cited by examiner

Primary Examiner—Samuel A. Acquah
(74) Attorney, Agent, or Firm—Sughrue Mion, PLLC

(57) ABSTRACT

Disclosed is a rubber composition for forming a core of a solid golf ball, the composition containing a base rubber (A); a filler (B); an organic peroxide (C); and a dry blend and/or a solvent slurry blend (D) of an unsaturated carboxylic acid metallic salt and a metal-containing organic sulfur compound represented by the following formula (1):

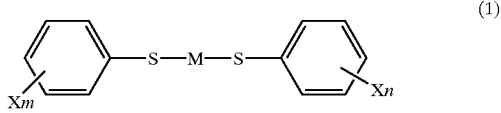

(1)

(wherein X represents a halogen atom, each of m and n represents an integer of 0 to 5 inclusive, and M represents a divalent metallic atom). The rubber composition exhibits high curing rate, and can be cured within shorter time, whereby productivity of a core can be improved.

15 Claims, 2 Drawing Sheets

RUBBER COMPOSITION FOR SOLID GOLF BALL, METHOD FOR PRODUCING THE RUBBER COMPOSITION, AND SOLID GOLF BALL

BACKGROUND OF THE INVENTION

1. Field of the Invention

The present invention relates to a rubber composition for forming a core of a solid golf ball.

2. Description of the Related Art

Conventionally, there have been disclosed techniques for incorporating a metallic salt of an organic sulfur compound such as pentachlorothiophenol into a rubber composition for forming a core of a solid golf ball, to thereby enhance restitution of the core (see Japanese Patent Nos. 2669051, 2961735, and 2778229).

However, as described above, when a metallic salt of an organic sulfur compound is incorporated into a rubber composition for forming a core of a solid golf ball, the curing rate of the rubber composition is lowered, whereby a long time is required for curing the rubber composition, resulting in poor productivity of a core. Meanwhile, when an organic sulfur composition such as thiol or sulfide is incorporated into a rubber composition for forming a core (see Japanese Patent Application Laid-Open (kokai) No. 2001-187167), a long time is required for curing the rubber composition, and the resultant core exhibits unsatisfactory restitution.

SUMMARY OF THE INVENTION

In view of the foregoing, an object of the present invention is to provide a rubber composition for forming a core of a solid golf ball, which exhibits high curing rate, to thereby attain short curing time and improve productivity of a core, and which enables formation of a core of excellent restitution.

In order to achieve the above object, the present inventors have performed extensive studies, and have found that, when a mixture of a metallic salt of an organic sulfur compound and a metallic salt of an unsaturated carboxylic acid, the mixture being prepared by mixing particles of these metallic salts without employment of a solvent (hereinafter the mixture may be referred to as a "dry blend"), and/or a mixture of these metallic salts prepared by mixing particles of the salts in a poor solvent for the particles and then removing the solvent (hereinafter the mixture may be referred to as a "solvent slurry blend") are incorporated into a rubber composition for forming a core of a solid golf ball, the curing rate of the rubber composition is increased.

The present invention has been accomplished on the basis of this finding. Accordingly, the present invention provides a rubber composition for a solid golf ball comprising a base rubber (A); a filler (B); an organic peroxide (C); and a dry blend and/or a solvent slurry blend (D) of an unsaturated carboxylic acid metallic salt and a metal-containing organic sulfur compound represented by the following formula (1):

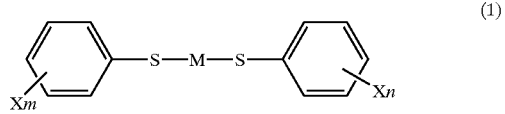

(1)

(wherein X represents a halogen atom, each of m and n represents an integer of 0 to 5 inclusive, and M represents a divalent metallic atom).

The present invention also provides a solid golf ball (specifically, a one-piece golf ball, or a multi-piece golf ball such as a two-piece golf ball or a three-piece golf ball) comprising a core formed from the rubber composition for a solid golf ball of the present invention.

The present invention also provides a method for producing a rubber composition for a solid golf ball comprising mixing a base rubber (A), a filler (B), an organic peroxide (C), a metal-containing organic sulfur compound (P) represented by formula (1), and an unsaturated carboxylic acid metallic salt (Q), wherein the metal-containing organic sulfur compound (P) represented by formula (1) is mixed with a portion or the entirety of the unsaturated carboxylic acid metallic salt (Q) in advance, to thereby prepare a blend (R); and the blend (R) is mixed with the base rubber (A), the filler (B), and the organic peroxide (C).

Preferably, the blend (R) is the aforementioned dry blend and/or solvent slurry blend (D)) of an unsaturated carboxylic acid metallic salt and a metal-containing organic sulfur compound represented by formula (1).

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DESCRIPTION OF THE INVENTION AND PREFERRED EMBODIMENTS

Figure 1:
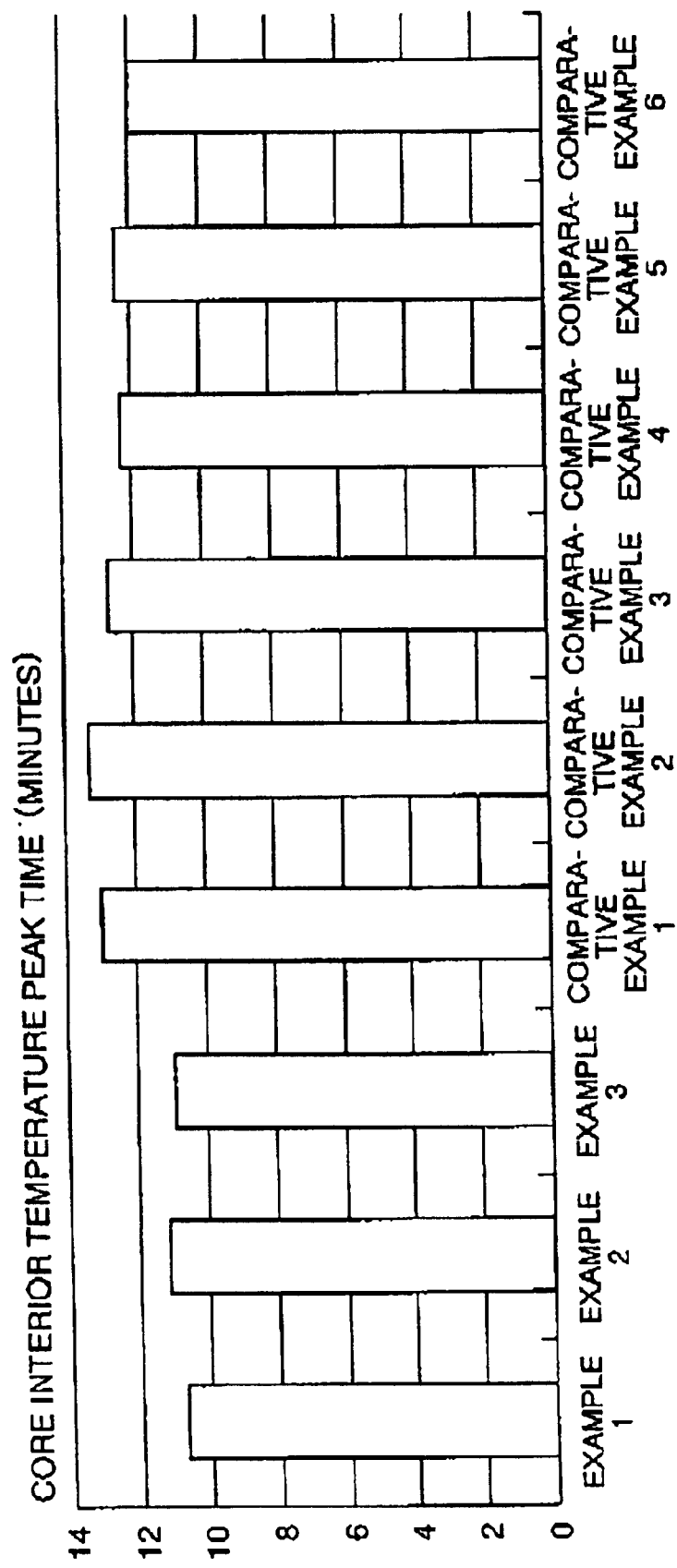
FIG. 1 is a graph showing temperature peak times during the molding of cores in Examples and Comparative Examples.

The present invention will next be described in detail. Firstly, components (A) to (D) will be described.

(A) Base Rubber

Examples of the base rubber include a rubber material predominantly containing, for example, polybutadiene rubber, polyisoprene rubber, or natural rubber. In order to enhance restitution of a core, polybutadiene rubber is preferably employed. Cis-1,4-polybutadiene in which cis segments account for at least 40% is preferably employed as polybutadiene rubber. If desired, the polybutadiene rubber may optionally contain, for example, natural rubber, polyisoprene rubber, or styrene-butadiene rubber.

(B) Filler

Examples of the filler include metal oxides and inorganic metallic salts. Specific examples include high-specific-gravity fillers such as zinc oxide, barium sulfate, tungsten powder, and molybdenum powder. In the rubber composition, the incorporation amount of the filler is typically 5 to 50 parts by weight on the basis of 100 parts by weight of the base rubber. The incorporation amount of the filler is determined in accordance with the specific gravity required for the resultant core.

(C) Organic Peroxide

Examples of the organic peroxide (cross-linking agent) include dicumyl peroxide, 1,1-bis(t-butylperoxy)-3,3,5-trimethylcyclohexane, and mixtures thereof. In the rubber composition, the incorporation amount of the organic peroxide is typically 0.3 to 5 parts by weight on the basis of 100 parts by weight of the base rubber.

(D) Dry Blend and/or Solvent Slurry Blend

In the present invention, as described above, the solvent slurry blend (D) is prepared by mixing particles of a metal-containing organic sulfur compound represented by formula (1), and particles of an unsaturated carboxylic acid metallic salt in a poor solvent for these two types of particles, to thereby form a slurry, and then removing the solvent from the slurry. As described above, the dry blend (D) is prepared by mixing these two types of particles without employment of a solvent.

Examples of the metal-containing organic sulfur compound represented by formula (1) include metallic salts of pentachlorothiophenol, pentafluorothiophenol, 4-chlorothiophenol, 4-bromothiophenol, 4-fluorothiophenol, 2,3-dichlorothiophenol, 2,4-dichlorothiophenol, 2,5-dichlorothiophenol, 2,6-dichlorothiophenol, 3,4-dichlorothiophenol, 3,5-dichlorothiophenol, and 2,4,5-trichlorothiophenol. Examples of the aforementioned metallic salts include zinc salts (i.e., M of formula (1) is zinc) and calcium salts. In order to enhance restitution of a core, use of a zinc salt is particularly preferred. Of the aforementioned metal-containing organic sulfur compounds, a pentachlorothiophenol zinc salt is particularly preferred.

Examples of the unsaturated carboxylic acid metallic salt (serving as a cross-linking agent) include metallic salts of, for example, acrylic acid and methacrylic acid. In order to enhance restitution of a core, zinc acrylate is particularly preferred as the unsaturated carboxylic acid metallic salt.

Examples of the solvent which may be employed for mixing the aforementioned components (i.e., the metal-containing organic sulfur compound and the unsaturated carboxylic acid metallic salt) include poor solvents for these components, such as toluene, benzene, n-hexane, cyclohexane, n-pentane, and n-heptane.

In the dry blend and/or the solvent slurry blend (D), the lower limit of the incorporation amount of the metal-containing organic sulfur compound represented by formula (1) is preferably 0.2 parts by weight, more preferably 1 part by weight, on the basis of 100 parts by weight of the unsaturated carboxylic acid metallic salt. The upper limit of the incorporation amount of the metal-containing organic sulfur compound is preferably 10 parts by weight, more preferably 5 parts by weight, on the basis of 100 parts by weight of the unsaturated carboxylic acid metallic salt. When the incorporation amount of the metal-containing organic sulfur compound is less than 0.2 parts by weight, restitution of the resultant core may be lowered, whereas when the incorporation amount exceeds 10 parts by weight, the curing rate of the rubber composition may be lowered. If desired, the dry blend and/or the solvent slurry blend (D) may contain other components. In the rubber composition, the incorporation amount of the dry blend and/or the solvent slurry blend (D) is typically 5 to 50 parts by weight on the basis of 100 parts by weight of the base rubber.

In the present invention, in addition to the aforementioned essential components (A) to (D), an unsaturated carboxylic acid metallic salt (E) may be incorporated into the rubber composition. When the metallic salt (E) is incorporated into the rubber composition, the hardness of the resultant solid golf ball core can be regulated. In this case, the ratio by weight of the dry blend and/or the solvent slurry blend (D) to the unsaturated carboxylic acid metallic salt (E) is preferably 100:1 to 100:100, more preferably 100:5 to 100:60. The lower limit of the incorporation amount of the unsaturated carboxylic acid metallic salt (E) is preferably 0.5 parts by weight, more preferably 1 part by weight, on the basis of 100 parts by weight of the base rubber. The upper limit of the incorporation amount of the unsaturated carboxylic acid metallic salt (E) is preferably 20 parts by weight, more preferably 15 parts by weight, on the basis of 100 parts by weight of the base rubber.

In the present invention, regardless of incorporation of the unsaturated carboxylic acid metallic salt (E), the lower limit of the incorporation amount of the unsaturated carboxylic acid metallic salt is preferably 15 parts by weight, more preferably 20 parts by weight, on the basis of 100 parts by weight of the base rubber, and the upper limit of the incorporation amount of the unsaturated carboxylic acid metallic salt is preferably 40 parts by weight, more preferably 35 parts by weight, on the basis of 100 parts by weight of the base rubber. As used herein, the expression "the incorporation amount of the unsaturated carboxylic acid metallic salt" refers to the incorporation amount of merely the unsaturated carboxylic acid metallic salt contained in the dry blend and/or the solvent slurry blend (D) in the case where the metallic salt (E) is not incorporated, or refers to the total incorporation amount of the metallic salt (E) and the unsaturated carboxylic acid metallic salt contained in the dry blend and/or the solvent slurry blend (D) in the case where the metallic salt (E) is incorporated.

When, in addition to the aforementioned components (A) to (E), a higher fatty acid or a metallic salt thereof is incorporated into the rubber composition for a solid golf ball of the present invention in an amount of 0.5 to 50 parts by weight on the basis of 100 parts by weight of the unsaturated carboxylic acid metallic salt, dispersibility of the unsaturated carboxylic acid metallic salt in the rubber composition can be improved. Examples of the higher fatty acid include stearic acid, palmitic acid, and oleic acid. These acids may be employed singly or in combination of two or more species. Examples of the metal constituting the higher fatty acid metallic salt include mono- to tri-valent metals such as lithium, sodium, potassium, magnesium, zinc, and aluminum.

The aforementioned unsaturated carboxylic acid metallic salt (E), unsaturated carboxylic acid metallic salt (Q), and metal-containing organic sulfur compound (P) represented by formula (1) are similar to those contained in the dry blend and/or the solvent slurry blend (D).

The rubber composition for a solid golf ball of the present invention can be obtained by kneading the aforementioned components by use of a typical kneading machine (e.g., a banbury mixer, a kneader, or a roll). The resultant rubber composition is subjected to injection molding or compression molding, to thereby form a core.

Deformation of the thus-formed core under application of a load of 100 kg is preferably 2.5 to 5.0 mm. When deformation of the core is excessively small; i.e., when the core is very hard, the resultant golf ball provides unsatisfactory feeling on impact. In contrast, when deformation of the core is excessively large; i.e., when the core is very soft, the resultant golf ball provides dull feeling on impact, and the golf ball may exhibit poor durability against cracking.

The solid golf ball of the present invention may be a one-piece golf ball formed from the aforementioned rubber composition of the present invention. The solid golf ball of the present invention includes a core formed from the aforementioned rubber composition of the present invention. For example, the solid golf ball may be a multi-piece golf ball (e.g., a two-piece golf ball or a three-piece golf ball) including the aforementioned core and a cover therefor. The cover may be formed of a single layer or two or more layers. In the solid golf ball of the present invention, the core may have a single-layer structure formed from a single material, or a multi-layer structure including two or more laminated layers formed from different materials. When the core has a multi-layer structure, at least one layer must be formed from the rubber composition for a solid golf ball of the present invention. Examples of the cover material to be employed include thermoplastic polymers such as ionomer, polyamide, polyester, and polyurethane.

EXAMPLES

The present invention will next be described in detail by way of Examples, which should not be construed as limiting the invention thereto. The incorporation components shown in Table 1 were kneaded by use of a test kneader to thereby prepare rubber compositions.

JSR-BR01 (product of Japan Synthetic Rubber Co., Ltd.) was employed as the polybutadiene rubber (i.e., base rubber (A)) shown in Table 1, and Percumyl D (product of Nippon Oil & Fats Co., Ltd.) was employed as the dicumyl peroxide (i.e., organic peroxide (C)) shown in Table 1. Zinc oxide was employed as the filler (B).

A blend A (i.e., solvent slurry blend (D)) was prepared through the following procedure: zinc acrylate and a pentachlorothiophenol zinc salt (ratio by weight: 100:3) were added to toluene, which is a poor solvent for these compounds; these compounds were mixed in the toluene to thereby form a slurry; and then the toluene was removed from the slurry.

A blend B was prepared through the following procedure: zinc acrylate and pentachlorothiophenol (ratio by weight: 100:3) were added to toluene, these compounds were mixed in the toluene, and then the toluene was removed. Since pentachlorothiophenol was dissolved in toluene, the resultant blend B was found to contain zinc acrylate coated with pentachlorothiophenol.

Subsequently, the above-prepared rubber compositions were subjected to compression molding at 160° C., to thereby produce cores having a diameter of 39.2 mm (Examples 1 through 3 and Comparative Examples 1 through 6). Table 1 and FIG. 1 show the temperature peak time of each of the cores during molding, and Table 1 shows the curing time of the core. The temperature peak time was obtained by measuring the time elapsed when the interior temperature of the core had reached a maximum after initiation of curing. The curing time was obtained by adding about four minutes to the temperature peak time.

Figure 2:
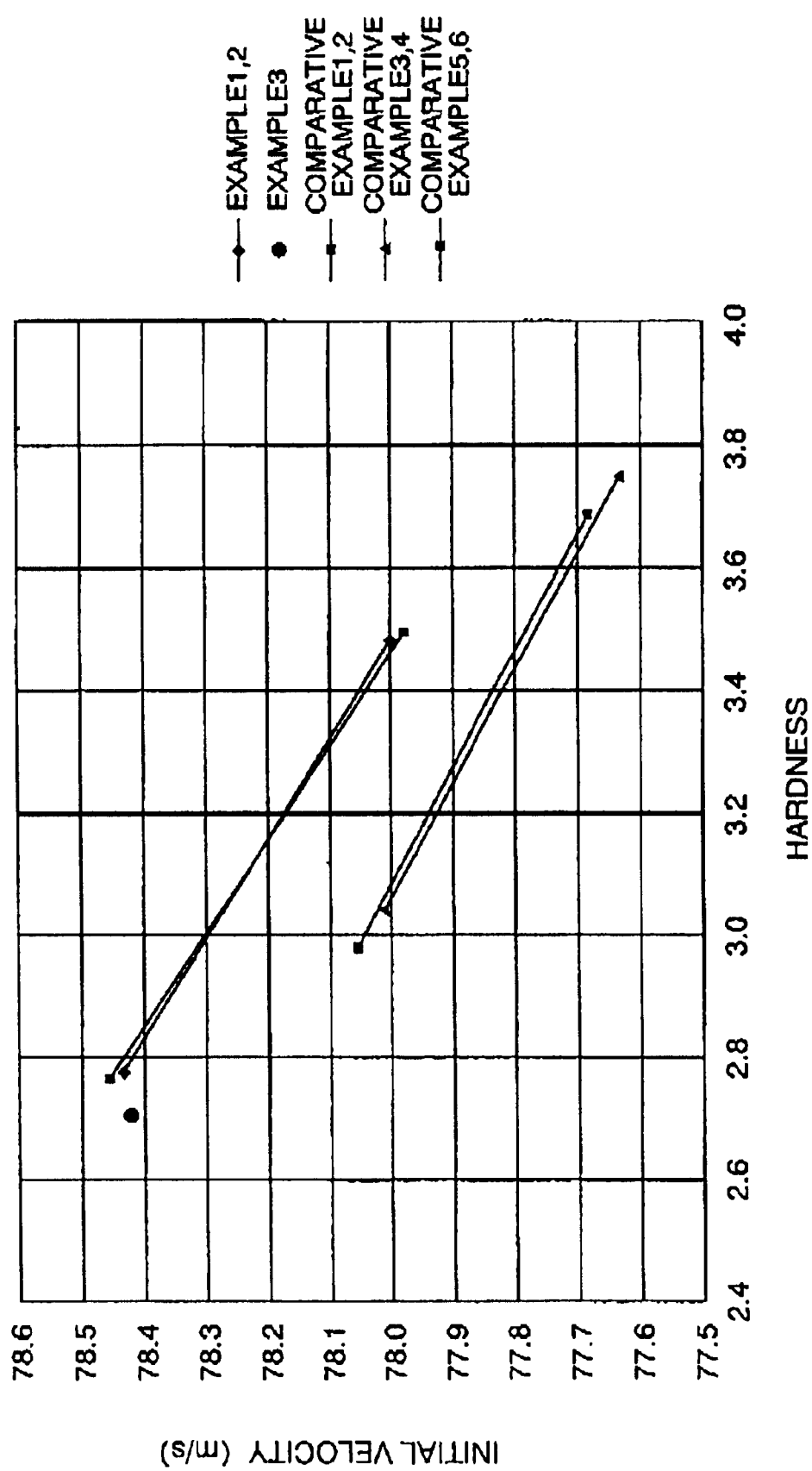
FIG. 2 is a graph showing the relation between hardness and initial velocity of each of cores formed in Examples and Comparative Examples.

Table 1 shows the hardness and initial velocity of each of the cores, and FIG. 2 shows the relation between hardness and initial velocity of the core. Deformation of the core under application of a load of 100 kg is considered the hardness of the core. The greater the deformation, the softer the core. The initial velocity of the core was measured by use of an initial velocity meter similar to that approved by USGA.

TABLE 1

| Incorporation components (part(s) by weight) | Example 1 | Example 2 | Example 3 | Comp. Example 1 | Comp. Example 2 | Comp. Example 3 | Comp. Example 4 | Comp. Example 5 | Comp. Example 6 |
|---|---|---|---|---|---|---|---|---|---|
| Polybutadiene rubber | 100 | 100 | 100 | 100 | 100 | 100 | 100 | 100 | 100 |
| Blend A | 30.9 | 25.75 | 25.75 | — | — | — | — | — | — |
| Blend B | — | — | — | — | — | 30.9 | 25.75 | — | — |
| Zinc acrylate | — | — | 5 | 30 | 25 | — | — | 30 | 25 |
| Pentachlorothiopherol zinc salt | — | — | — | 0.9 | 0.75 | — | — | — | — |
| Pentachlorothiophenol | — | — | — | — | — | — | — | 0.9 | 0.75 |
| Zinc oxide | 18.7 | 20.9 | 18.7 | 18.7 | 20.9 | 17.8 | 20.1 | 17.8 | 20.1 |
| Dicumyl peroxide | 1 | 1 | 1 | 1 | 1 | 1 | 1 | 1 | 1 |
| Temperature peak time (minutes) | 10.6 | 11.1 | 10.9 | 12.8 | 13.1 | 12.5 | 12.1 | 12.2 | 12 |
| Curing time (minutes) | 14.5 | 14 | 15 | 17 | 17 | 16.5 | 16 | 16 | 16 |
| Core hardness (mm) | 2.77 | 3.49 | 2.70 | 2.76 | 3.5 | 3.04 | 3.75 | 2.97 | 3.68 |
| Core initial velocity (m/s) | 78.44 | 78 | 78.42 | 78.46 | 77.98 | 78.01 | 77.63 | 78.06 | 77.69 |

As is clear from Table 1 and FIGS. 1 and 2, the rubber composition of the present invention attains short temperature peak time and short curing time. The results show that the core formed from the rubber composition of the present invention exhibits increased initial velocity and excellent restitution.

As described above, the rubber composition for a solid golf ball of the present invention exhibits high curing rate, and can attain short curing time to thereby improve productivity of a core.

What is claimed is:

1. A rubber composition for a solid golf ball comprising a base rubber (A); a filler (B) an organic peroxide (C); and a dry blend and/or a solvent slurry blend (D) of an unsaturated carboxylic acid metallic salt and a metal containing organic sulfur compound represented by the following formula (1):

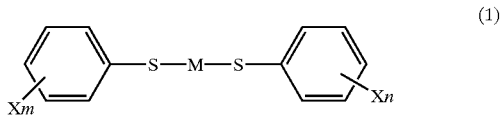

(wherein X represents a halogen atom, each of m and n represents an integer of 0 to 5 inclusive, and M represents a divalent metallic atom).

2. A rubber composition for a solid golf ball according to claim 1, which further comprise, an unsaturated carboxylic acid metallic salt (E).

3. A rubber composition for a solid golf ball according to claim 2, wherein the ratio by weight of the dry blend and/or the solvent slurry blend (D) to the unsaturated carboxylic acid metallic salt (E) is 100:1 to 100:100.

4. A rubber composition for a solid golf ball according to claim 2, wherein the incorporation amount of the unsaturated carboxylic acid metallic salt (E) is 0.5 to 20 parts by weight on the basis of 100 parts by weight of the base rubber (A).

5. A rubber composition for a solid golf ball according to claim 1, wherein the incorporation amount of the dry blend and/or the solvent slurry blend (D) is 5 to 50 parts by weight on the basis of 100 parts by weight of the base rubber (A).

6. A rubber composition for a solid golf ball according to claim 1, wherein the incorporation amount of the unsaturated carboxylic acid metallic salt is 15 to 40 parts by weight on the basis of 100 parts by weight of the base rubber (A), and the incorporation amount of the metal-containing organic sulfur compound represented by formula (1) is 0.05 to 3 parts by weight on the basis of 100 puts by weight of the base rubber (A).

7. A rubber composition for a solid golf bell according to claim 1, wherein, in the dry blend and/or the solvent slurry blend (D), the incorporation amount of the metal-containing organic sulfur compound is 0.2 to 10 parts by weight on the basis of 100 parts by weight of the unsaturated carboxylic acid metallic salt.

8. A rubber composition for a solid golf bell according to claim 1, wherein, in the metal-containing organic sulfur compound represented by formula (1), M is zinc.

9. A rubber composition for a solid golf ball according to claim 1, wherein the metal-containing organic sulfur compound represented by formula (1) is a pentachlorothiophenol zinc salt.

10. A rubber composition for a solid golf ball according to claim 1, wherein the unsaturated carboxylic acid metallic salt is zinc acrylate.

11. A multi-piece solid golf ball comprising a core formed from a rubber composition for a solid golf ball as recited in claim 1.

12. A one-piece solid golf ball formed from a rubber composition for a solid golf ball as recited in claim 1.

13. A method for producing a rubber composition for a solid golf ball comprising mixing a base rubber (A), a filler (B), an organic peroxide (C), a metal-containing organic sulfur compound (P) represented by the following formula (1), and an unsaturated carboxylic acid metallic salt (Q), wherein the metal-containing organic sulfur compound (P) represented by formula (1) is mixed with a portion or the entirety of the unsaturated carboxylic acid metallic salt (Q) in advance, to thereby prepare a blend (R) and the blend (R) is mixed with the base rubber (A), the filler (B), and the organic peroxide (C)

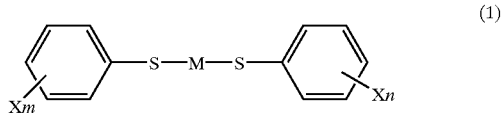

(wherein X represents a halogen atom, each of m and n represents an integer of 0 to 5 inclusive, and M represents a divalent metallic atom).

14. A method for producing a rubber composition for a solid golf ball according to claim 13, wherein the blend (R) contains the entirety of the metal-containing organic sulfur compound (P) represented by formula (1) and 50 wt. % or more of the unsaturated carboxylic acid metallic salt (Q).

15. A method for producing a rubber composition for a solid golf ball according to claim 13, wherein the blend (R) is a dry blend and/or a solvent slurry blend (D) of an unsaturated carboxylic acid metallic salt and a metal-containing organic sulfur compound represented by formula (1).

* * * * *